United States Patent [19]

Gailer et al.

[11] Patent Number: 5,323,161
[45] Date of Patent: Jun. 21, 1994

[54] METHOD OF ASSESSING RADAR TARGET PULSES

[75] Inventors: James M. Gailer, St. Albans; Martin R. Winstone, Watford, both of England

[73] Assignee: The Marconi Company Limited, England

[21] Appl. No.: 382,974

[22] Filed: Jul. 13, 1989

Related U.S. Application Data

[63] Continuation-in-part of Ser. No. 104,855, Sep. 21, 1987, abandoned.

[51] Int. Cl.⁵ .............................................. G01S 7/292
[52] U.S. Cl. ........................................ 342/13; 342/159
[58] Field of Search .................... 342/13, 16, 17, 159

[56] References Cited

U.S. PATENT DOCUMENTS

| | | | |
|---|---|---|---|
| 3,714,654 | 1/1973 | Wicks et al. | 342/13 |
| 3,922,676 | 11/1975 | O'Berry et al. | 342/13 |
| 4,025,920 | 5/1977 | Reitboeck et al. | 342/13 |
| 4,040,054 | 8/1977 | Overman | 342/13 |
| 4,109,197 | 8/1978 | Lang, Jr. et al. | 324/78 F |
| 4,146,892 | 3/1979 | Overman et al. | 342/20 |
| 4,173,760 | 11/1979 | Garrison | 342/13 X |
| 4,176,357 | 11/1979 | Fales, III | 342/13 X |
| 4,217,580 | 8/1980 | Lowenschuss | 342/13 |
| 4,393,382 | 7/1983 | Jones | 342/13 X |
| 4,651,332 | 3/1987 | Brown | 377/20 |
| 4,721,958 | 1/1988 | Jenkin | 342/13 |
| 4,851,854 | 7/1989 | Drogin | 342/417 |

*Primary Examiner*—John B. Sotomayor
*Attorney, Agent, or Firm*—Kirschstein, Ottinger, Israel & Schiffmiller

[57] ABSTRACT

A method of assessing radar pulses in a passive, i.e. receive-only, radar system to distinguish pulses due to a particular target from pulses due to other targets from noise, interference, etc. Received pulses are assessed, without reference to pulse transmission information, in respect of a number of characteristics by comparing each characteristic of a pulse with the mean value of the respective characteristic for pulses previously received. Using a probability process, confidence values for the pulse can be calculated. By combining the confidence values for each characteristic, an overall confidence value is obtained for the pulse so that it can be determined whether it arises from the particular target.

8 Claims, 1 Drawing Sheet

METHOD OF ASSESSING RADAR TARGET PULSES

This application is a continuation-in-part of our co-pending application Ser. No. 104,855 filed Sept. 21 1987, now abandoned.

BACKGROUND OF THE INVENTION

This invention relates to a method of assessing radar pulses in a passive receiving system to distinguish pulses due to a particular target from pulses due to other targets, from noise, interference etc. Received pulses may be assessed, without reference to pulse transmission information, in respect of a number of characteristics; for example, direction of reception (angle off boresight), power level, pulse width, pulse repetition interval (PRI), and also radio frequency, if an absolute measurement of frequency is available. Each of these characteristics, even in respect of a particular target, is subject to variation due to noise, interference etc., and significant tolerances have to be employed in the assessment of each pulse.

Conventional signal processing methods rely, in the case of active radars, on the known characteristics of the transmitted pulse. Such systems are primarily concerned with detection of target echoes among clutter. The receiver has a priori knowledge of the nature of the echo signal it is seeking to identify since it usually forms part of an active radar system, which has itself determined the transmitted pulse waveform. The task is, therefore, to pick out this known waveform from clutter and noise, and a comparison with the known pulse data is the obvious solution. This invention is directed to working in a much more demanding situation to identify a target which is emitting radar pulses that have not originated from the detecting radar. Thus, the target may well be a radar transmitter itself. In such a situation there is initially no foreknowledge of the received pulse waveform and it may have to be identified not so much from clutter as from other conflicting radar signals. Conventionally, passive, i.e. receive-only, radars have compared the value of the particular characteristic with preset limits and accepted or rejected the pulse accordingly. The tolerance band set for such a comparison leads to a significant probability of a wrong signal being accepted, with a consequent loss of ability to distinguish targets. This invention is directed to the statistical assessment of received pulses in respect of a number of characteristics by reference only to previously received pulses to establish a confidence value that a train of received pulses arises from a particular target.

SUMMARY OF THE INVENTION

An object of the present invention is thus to improve the ability of a passive radar receiver to assess and identify target pulses, without reference to pulse transmission information.

According to one aspect of the present invention a method of assessing target radar pulses received by an antenna of a passive radar receiver in respect of a plurality of pulse characteristics comprises the steps of: determining the value of at least two said characteristics for a pulse, determining the man value of each said characteristic for previously received pulses, comparing the value of each said characteristic for a pulse with said mean value and deriving an increment, subjecting each said increment to a probability process to provide a confidence value for the pulse, combining the confidence values for said at least two characteristics to provide an overall confidence value for said pulse and, performing all of said steps without reference to pulse transmission information.

Said plurality of pulse characteristics preferably comprises at least two of: the target angle, the pulse power level, the pulse width and the pulse repetition interval.

In a preferred embodiment of the Invention said plurality of pulse characteristics preferably comprises the target angle and at least one of: the pulse power level, the pulse width and the pulse repetition interval. The probability process to provide a confidence value for the pulse preferably takes account of an estimated thermal noise component of the pulse tn determining said confidence value. The angle between the target and the antenna boresight may be derived from measured values of the target angle In azimuth and elevation. A mean value of the target angle may be derived from mean values of the azimuth and elevation target angles.

According to another aspect of the invention, the confidence value in respect of at least one of said characteristics is subjected to a respective weighting factor responsive to predetermined uncertainty in the particular characteristic values.

According to a further aspect of the invention a passive radar receive includes pulse assessment circuitry for distinguishing a target signal from other radar transmissions, without recourse to pulse transmission information, and said circuitry comprises: means in respect of each of a plurality of pulse characteristics for determining the current value of the respective characteristic, means for determining the mean value of said respective characteristic for previously received pulses, means for comparing said current value with said mean value and deriving an incremental difference, means for subjecting said incremental difference to a probability process based on factors exclusive of prior information concerning radar emissions from the target, and for producing a confidence value in respect of the current pulse being an emission from said target, and means for combining the confidence values produced in respect of each of said pulse characteristics of said current pulse to produce an overall confidence value in respect of said current pulse.

BRIEF DESCRIPTION OF THE DRAWING

The sole figure is a block diagram of the instant invention.

DETAILED DESCRIPTION OF THE PREFERRED EMBODIMENT

Figure 1:
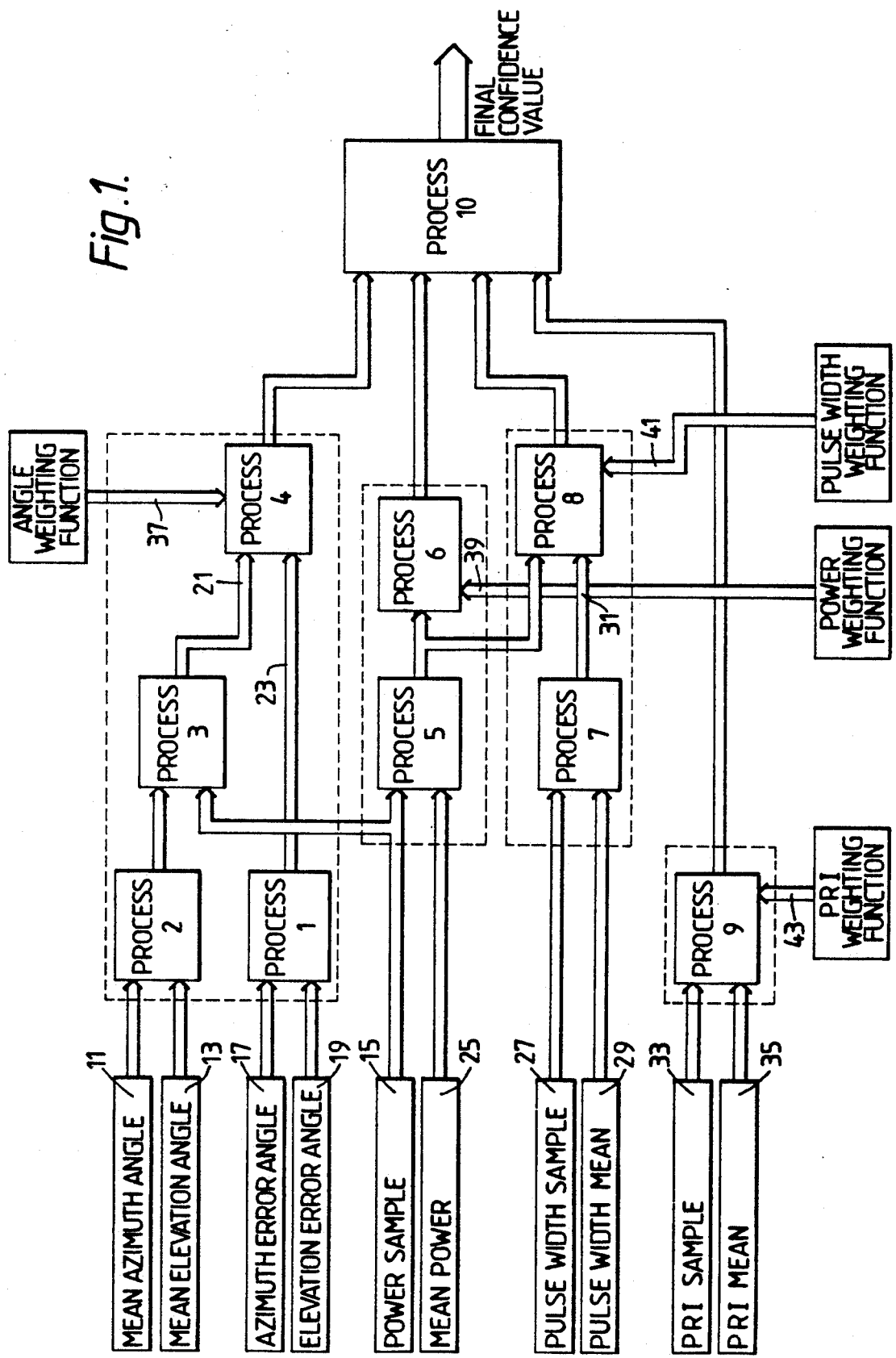

A method of assessing received radar pulses, and apparatus for performing such a method.

Four characteristics of a radar pulse signal are detected: (a) the angle of the source off the antenna boresight, (b) the power level of the received pulses, (c) the pulse width of the received signal and (d) the pulse repetition interval.

The source angle is measured for a particular currently measured pulse in azimuth and elevation in conventional runner. Referring to the drawing, a mean value of the azimuth angle for previous pulses determined as having come from the same source is stored in a store 11 and applied to a Process 2. Similarly, a mean value of the elevation angle, relative to the direction of the receiving antenna, of previous pulses is applied via a store 13 to Process 2. The Process 2 produces from these two values a mean value of the angle off boresight in the target plane:

$$[(\text{mean azimuth angle})^2 + (\text{mean elevation angle})^2]^{\frac{1}{2}},$$

this latter value of angle off boresight being applied to Process 3. A second input to Process 3 is derived from a power measurement of the currently measured pulse provided by input 15.

Angle error is primarily caused by thermal noise effects. Although the magnitude of this thermal noise is not predictable, the r.m.s. angle error due to thermal noise can be estimated, being dependent on power and the target angle off boresight. Process 3, provided with the expected (i.e. mean) target angle off boresight (calculated by Process 2) and the pulse power value (from input 15), takes an estimate of the thermal noise level for application to Process 4 at input 21.

Values of azimuth and elevation angle errors are applied to stores 17 and 19, these error values being derived as differences between the above mentioned mean values of the azimuth and elevation angles on the one hand and the angles derived from the currently measured pulse on the other. It will be appreciated that these so-called error values may result from positional changes of the target and/or displacement of the radar receiving antenna, although a typical pulse repetition rate will be sufficiently high to produce only small changes due to these effects. Process 1 takes the azimuth and elevation error angles (i.e. the angle difference between the mean target bearing as measured over many previous pulses and the target bearing as measured for the single target pulse currently being evaluated) and produces a target plane error angle by implementing the function:

$$[(\text{azimuth error})^2 + (\text{elevation error})^2]^{\frac{1}{2}}$$

This target plane error angle is applied to input 23 of Process 4.

Process 4 assesses the probability that the target angle as indicated by the error input at 23 is the true target angle in view of the estimated level of thermal noise input at 21. The output of Process 4 gives a value indicating the level of confidence that can be attributed to the target angle measured from the currently received pulse and this value is applied as one contributory input to Process 10.

In similar manner a power increment or error is derived by Process 5 from a currently measured power measurement at input 15 and a mean power level in respect of $2^n$ previous pulses, where $i \leq n \leq 5$ stored in store 25, the formula used being an integral function of $$\frac{ke^{-a/y}da}{y}$$

where
k is a constant
a is the power of the currently measured pulse sample
y is the mean power level The currently measured power increment is applied to Process 6 which makes a statistical estimate of the probability that the power increment is a true value and hence that the currently measured pulse power is a true value. The output of Process 6 gives a power confidence value accordingly and this is applied as a further contributory input to the Process 10.

The radar signal pulse width is also characteristic of the target and the measured value is applied by input 27 while the mean value of preceding pulse widths is stored in store 29. The difference is extracted in Process 7 using the formula (mean pulse width) − (currently measured pulse width)

to give a pulse width increment which is applied to one input 31 of Process 8. The currently measured pulse power level and the pulse power increment are factors related to the pulse width and the power increment derived by Process 5 is applied as an input to Process 8. This process then estimates, in the light of the power values, the probability of the measured pulse width being a true value using the formula $$\frac{k}{\sigma} \cdot \exp\left[\frac{-(\text{pulse width error})^2}{2\sigma}\right]$$

where $\sigma$ is the standard deviation of the pulse width and provides a corresponding pulse width confidence level output to Process 10.

Finally, the measured value of the pulse repetition interval (PRI) is applied via input 33 to a Process 9 together with a mean value in respect of $2^n + 1$ previous pulses where $1 \leq n \leq 6$ stored in store 35. The PRI weighting function identifies characteristics of the waveform such as whether it is fixed, jittering or staggered. Process 9 extracts the difference between the current and mean values and estimates the probability of the currently measured interval being the true value. The output of Process 9 is applied as the final contributory input to Process 10.

Each of the Processes 4, 6, 8 & 9 is subject to a respective weighting factor, from inputs 37, 39, 41 & 43, to take account of over-riding uncertainty factors which should adjust the significance of the particular characteristic. Thus, if the pulse train exhibited PRI jitter then the importance of a PRI error would be downgraded by means of this weighting factor accordingly.

The combining Process 10 provides a final combined confidence value which averages the individual values when they are close but allows extremely low individual values to over-ride the remainder.

The assessment of the inputs is carried out in three stages. Firstly, the PRI probability is combined with the pulse width probability by the process $$\frac{[\text{Probability}(\text{pulse width}) + X] \cdot [\text{Probability}(PRI)]}{K + X}$$

where
K is a constant
X is a weighting function which is a function of the PRI weighting.

Secondly, the probabilities for angle and power are combined using the function

Probability (angle)·Probability (power)

Thirdly, the two outputs are combined to provide an overall probability using the function $$[\text{Probability (angle/power)} \cdot \text{Probability (pulse width/PRI)}]^{\frac{1}{2}}$$

The combined confidence value is compared against a reference value to determine whether the currently received pulse is to be accepted as being from a particular target or not. Where a number of targets are involved the pulses may be distributed to selected individual assessment circuits depending on the magnitudes of the various error values, each pulse being allocated to the circuit giving the smallest error value on the greatest number of characteristics.

While four characteristics of a pulse train have been considered above, fewer or more may be evaluated.

We claim:

1. A method of assessing target radar pulses received by an antenna of a passive radar receiver in respect of a plurality of pulse characteristics comprising the steps of:
   (a) determining value of at least two said characteristics for a received pulse;
   (b) determining the mean value of each said characteristic for previously received pulses;
   (c) comparing the value of each said characteristic for a pulse with said mean value and deriving an increment;
   (d) subjecting each said increment to a probability process to provide a confidence value for each pulse characteristic;
   (e) combining the confidence values for said at least two characteristics to provide an overall confidence value for said pulse; and
   (f) performing all of said steps without reference to pulse transmission information.

2. A method according to claim 1 in which said plurality of pulse characteristics comprises at least to of: the target angle, the pulse power level, the pulse width and the pulse repetition interval.

3. A method according to claim 1 in which said plurality of pulse characteristics comprises the target angle and at least one of: the pulse power level, the pulse width and the pulse repetition interval.

4. A method according to claim 3 in which said probability process to provide a confidence value for said target angle takes account of an estimated thermal noise component of the received pulse.

5. A method according to claim 3 in which said target angle comprises the angle between the target and the antenna boresight and is derived from measured values of the target angle in azimuth and elevation.

6. A method according to claim 5 in which a mean value of the target angle is derived from mean values of the azimuth and elevation target angles.

7. A method according to claim 1 in which the confidence value in respect of at least one of said pulse characteristics is subjected to a respective weighting factor responsive to predetermined uncertainty in the particular characteristic value.

8. A passive radar receiver including pulse assessment circuitry for distinguishing a target signal from other radar transmission, without recourse to pulse transmission information, said circuitry comprising:
   (a) means in respect of each of a plurality of pulse characteristics for determining the current value of the respective characteristic;
   (b) means for determining the mean value of said respective characteristic for previously received pulses;
   (c) means for comparing said current value of each said characteristic with said mean value and deriving an incremental difference;
   (d) means for subjecting each said incremental difference to a probability process based on factors exclusive of prior information concerning radar emissions from the target, and for producing a confidence value for each pulse characteristic in respect of the current pulse being an emission from said target; and
   (e) means for combining the confidence values produced in respect of each of said pulse characteristics of said current pulse to produce an overall confidence value in respect of said current pulse.

* * * * *